INVENTOR
Henry J. Blaskowski
BY
Eldon H. Luther
ATTORNEY

Sept. 28, 1965 H. J. BLASKOWSKI 3,208,832
COMBINATION OF REGENERATOR AND SUPERCHARGED VAPOR GENERATOR
Filed Dec. 15, 1961 5 Sheets-Sheet 3
Fig. 3.
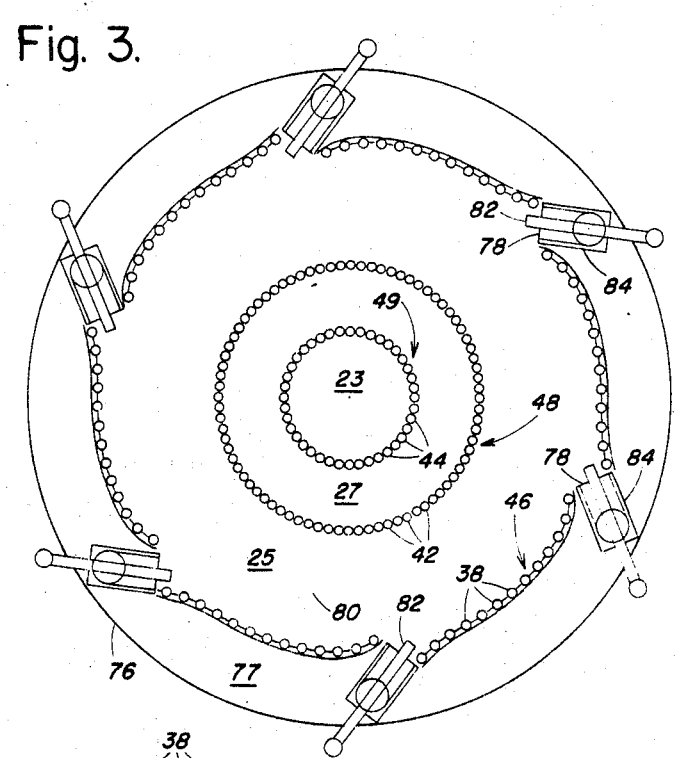
Fig. 6.
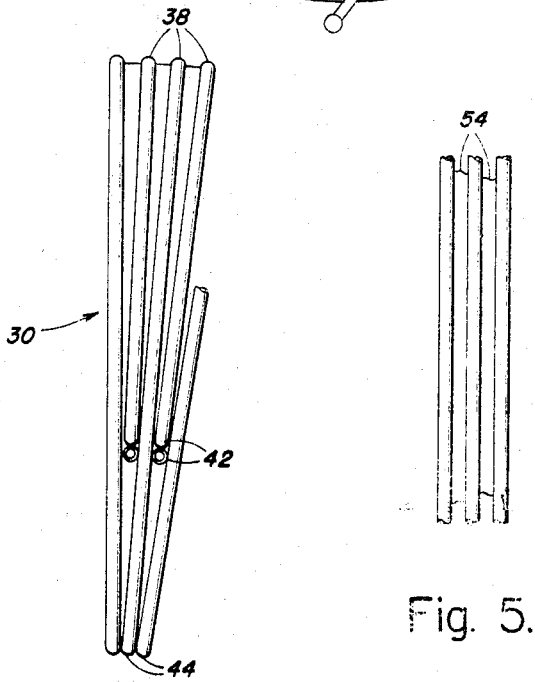
Fig. 5.
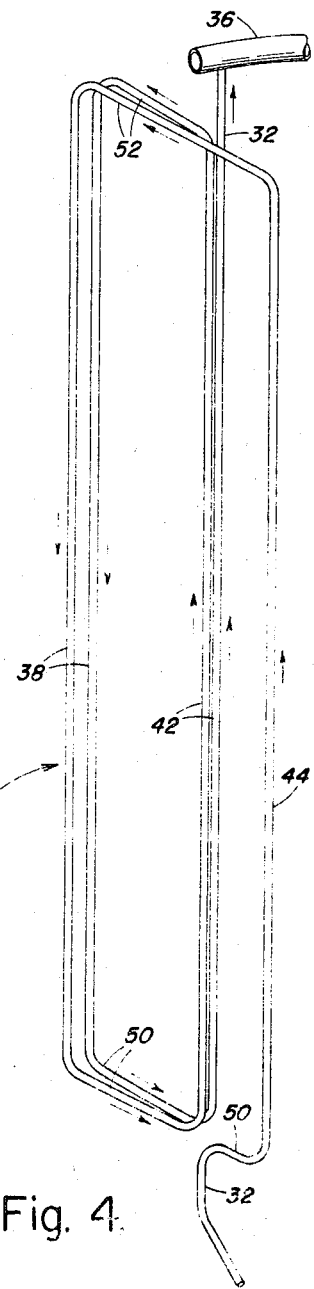
Fig. 4.
INVENTOR
Henry J. Blaskowski
BY
Eldon H. Luther
ATTORNEY Sept. 28, 1965 H. J. BLASKOWSK 3,208,832
COMBINATION OF REGENERATOR AND SUPERCHARGED VAPOR GENERATOR
Filed Dec. 15, 1961 5 Sheets-Sheet 5

INVENTOR
Henry J. Blaskowski
BY *Eldon H. Luther*
ATTORNEY

United States Patent Office 3,208,832
Patented Sept. 28, 1965

---

3,208,832
COMBINATION OF REGENERATOR AND SUPERCHARGED VAPOR GENERATOR
Henry J. Blaskowski, Simsbury, Conn., assignor to Combustion Engineering, Inc., Windsor, Conn., a corporation of Delaware
Filed Dec. 15, 1961, Ser. No. 159,602
7 Claims. (Cl. 23—288)

This invention relates generally to the combination of a regenerator as employed in a catalytic cracker installation and a supercharged vapor generator receiving as part of its fuel the gaseous effluent from the regenerator.

It is an object of the invention to provide such a combination which is economical and efficient in operation and where the B.t.u. value contained in the effluent gases of the regenerator may be advantageously utilized.

A further object of the invention is to provide such a combination wherein the effluent in the cracker is supplied to the supercharged vapor generator with the burnables in the effluent being burned in the generator with the exhaust from the generator being utilized to operate a gas turbine which in turn operates a compressor to supply compressed air to the vapor generator and to the regenerator and with the exhaust from the turbine being further reduced in temperature by passing over heat exchange surface before being discharged to the atmosphere.

Another object of the invention is to provide such a combination wherein energy in the effluent from the regenerator is employed to generate vapor and to supply compressed air to the regenerator and to the vapor generator.

Still another object of the invention is to provide an improved supercharged vapor generator wherein efficient combustion is provided with the generator design being economic and relatively simple to manufacture.

Another object is to provide such an improved supercharged vapor generator wherein the pressure parts are disposed within a pressure resistant casing and form the passageways of the vapor generator with compressed air being supplied to the casing and from there introduced into the chamber wherein combustion takes place to support said combustion.

A further object of the invention is to provide an improved supercharged vapor generator having a unique arrangement with regard to the vapor and liquid drum.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein;

FIG. 3 is a transverse sectional view of the vapor generator of FIG. 2 with this view being taken generally from line 3—3 of FIG. 2;

FIG. 4 is a fragmentary perspective view of a portion of the vapor generator of FIG. 2 with this view showing one of the tubular sections or assemblies which are disposed in the generator in side-by-side relation and form the chambers or passageways thereof;

Figure 2:
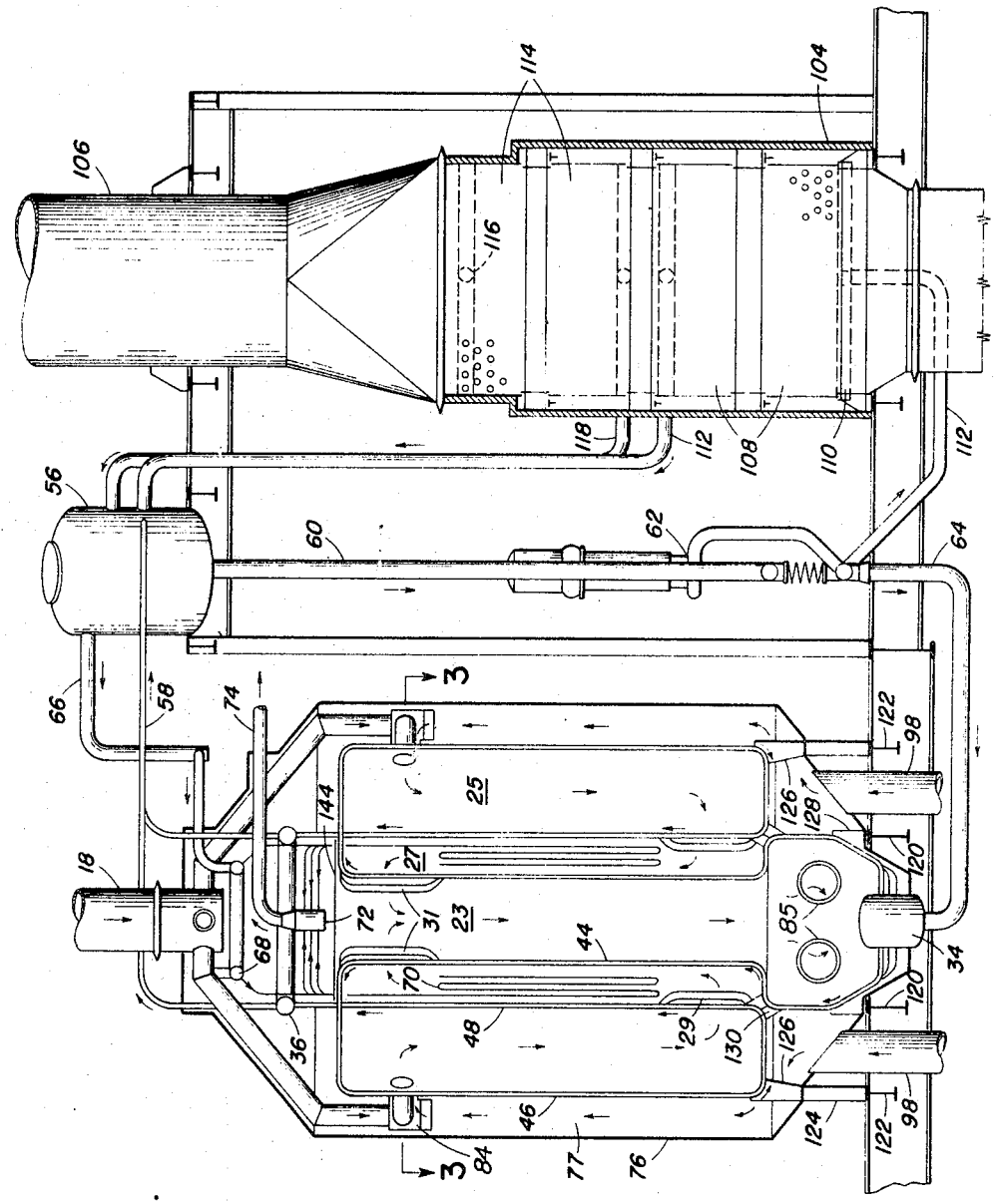
FIG. 2 is in the nature of a vertical section through the control circulation vapor generator forming part of the combination disclosed in FIG. 1.
Figure 7:
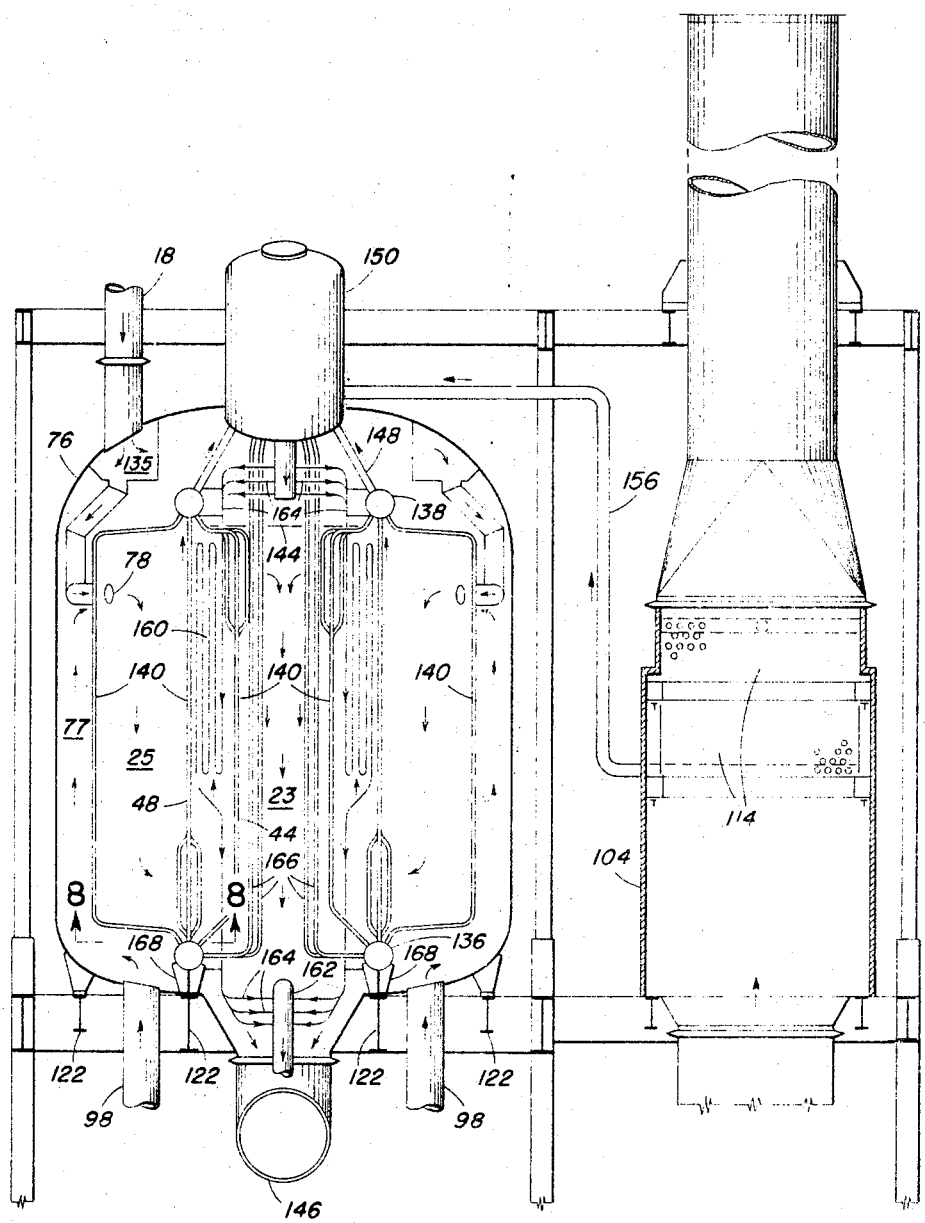
Figure 8:
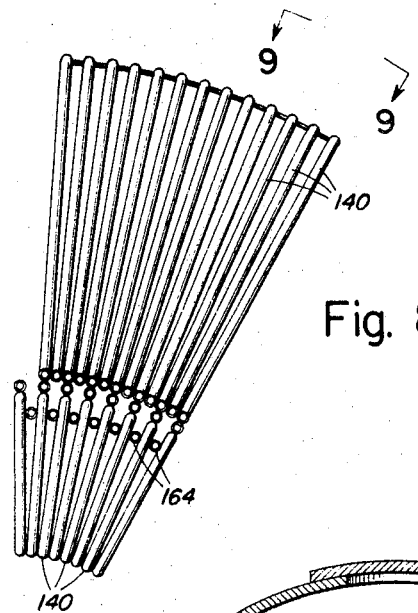
Figure 9:
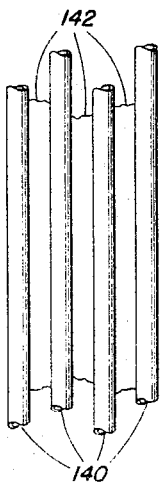
Figure 10:
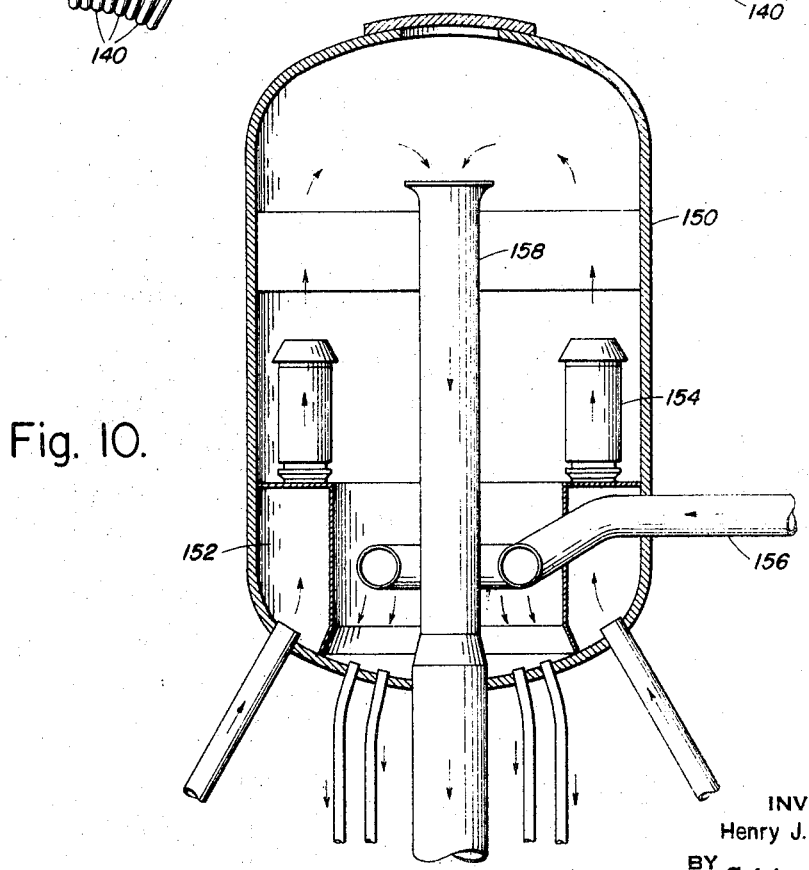

SIG. 5 is a fragmentary view of a portion of one of the chamber or passageway walls of the vapor generator showing the vertically disposed tube runs welded together;

FIG. 6 is a vertical elevational view, fragmentary in nature, showing a number of the tubular sections or assemblies disposed in side-by-side relation;

FIG. 7 is a view similar to that of FIG. 2, being in the nature of a vertical sectional view, and showing a modified vapor generator which is of the natural circulation type;

FIG. 8 is a fragmentary view showing the disposition of the tubular elements which form the passageways of the generator with this view taken generally from line 8—8 of FIG. 7;

FIG. 9 is a view, fragmentary in nature, showing how the vertical tube portions are welded together to form a wall with this view being taken generally from line 9—9 of FIG. 8; and FIG. 10 is a vertical sectional view through the vapor and liquid drum of the natural circulation vapor generator.

Referring now to the drawings wherein like reference numerals are used throughout to designate like elements, the illustrative and preferred embodiment of the invention depicted therein includes the regenerator 10 of a catalytic cracker and wherein the catalyst used in the cracking of oil is regenerated, having the carbon stripped or burned therefrom. Compressed air is introduced into the lower region of the regenerator through the duct 12 and the gaseous effluent that egresses from the regenerator is conveyed to dust collector 14 through duct 16. This gaseous effluent is under superatmospheric pressure as for example 30 p.s.i. lbs. per sq. in. gauge, has a high temperature, as for example 1200°, and contains a relative minor amount of CO, as for example 5 to 9 percent. While the percentage of CO is relatively small, due to the large volume of gases that egress from the generator the total quantity of CO is appreciable. Because of the high temperature of the gases as well as the burnable constituent therein these gases have a relatively high B.t.u. content and accordingly may be advantageoulsy employed in a vapor generator. After having the foreign material moved therefrom in the dust collector 14 the regenerator gaseous effluent is conveyed through duct 18 to the supercharged vapor generator 20 where this effluent is utilized as a portion of the fuel fired in the vapor generator.

As illustratively disclosed in FIGS. 1 through 5 the vapor generator includes a number of internested passageways or chambers which are formed by means of tubular members with the centermost passageway being identified as 23 and the outermost annular passageway being identified as 25 while intermediate these passageways is the annular passageway 27. These passageways or chambers are formed by means of what is known in the art as pressure parts of the vapor generator and particularly by means of vapor generating tubes. In the arrangement disclosed, there are a number of tubular sections or assemblies (FIG. 4) identified as 30 with each section being formed of a single generating tube 32 wound into a plurality of loops as shown with the inlet or lower end of the tube being connected with the drum or pipe type header 34 while the outlet or upper end is connected with the annular or toroidal header 36. Each of the sections or assemblies 30 includes the vertical tube runs 38, 42 and 44, and the assemblies are disposed in side-by-side relation, generally radial with respect to the axis of the centermost chamber or passageway 23, with the tube runs 38 forming the wall 46 of annular chamber or passageway 25 while tube runs 42 form the wall portion 48 between passageways 25 and 27 and tube runs 44 form the wall 49 between the centermost passageway 23 and passageway 27. The lower horizontally extending tube runs 50 form the floor of passageways 25 and 27 while the upper horizontal tube runs 52 of the assemblies 30 form the roofs or upper ends of the passageways 25 and 27. Adjacent tube runs, including both horizontal and vertical runs, in the assemblies and in adjacent assemblies are welded together to form a fluid type generally imperforate structure with the fin or spacer members 54 being provided where necessary as a result of the adjacent tube runs being spaced. With this arrangement the sections or assemblies may be fabricated in the shop and assembled in the field with this construction facilitating the assembly operation. The upper end of the centermost chamber 23 is closed or capped by place member 144.

The circulating circuit of the vapor generator includes the vapor and liquid drum 56 which receives the vapor and liquid mixture produced in the vapor generating tubes 30 with this mixture being conveyed from the header 36 through connecting conduits 58 to the drum 56. In drum 56 the vapor is separated from the liquid with the liquid being conveyed down through downcomer 60 to the inlet of pump 62 with this pump being effective to provide a positive circulation of the liquid through the conduit 64 to the distribution header 34. The inlets of the vapor generating tubes 32 are preferably fitted with orifices so as to control the flow through the various tubes as desired thereby insuring a proper distribution of the fluid and insuring that tubes in particular locations are not overheated.

The vapor generator of the invention produces superheated vapor and for this purpose vapor is conveyed from the upper region of drum 56 through conduit 66 to the annular or toroidal distribution header 68. Connected with this header are the inlets of a number of superheater tubes 70 which are bent in sinuous fashion as disclosed and are placed in passageway 27 with these tubes being connected at their outlets with pipe type header 72 which conveys the vapor through conduit 74 and a suitable point of use.

The vapor generating tubes 32 and connecting headers are mounted within the upright fluid tight metallic casing 76 with this casing being spaced from the outer wall 46 of passageway 25 to provide an area 77 therebetween.

The vapor generator is supercharged or in other words pressure fired with the effluent gases from the generator being introduced into the upper region of the annular chamber or passageway 25 through the burners or nozzles 78 which are oriented to discharge this gas tangent to imaginary cylinder identified as 80 and so a whirling gas mass is provided in the chamber 25. Since there is a relatively small percentage of combustibles in the regenerator gaseous effluent supplemental fuel is also introduced into chamber 25 at the nozzle location 78 and in the same direction as this gaseous effluent with discharge conduits 82 being provided for this purpose with these conduits as disclosed being mounted within and extending through the nozzles 78 and connected with a suitable source of fuel not disclosed.

Combustion supporting air under superatmospheric pressure is admitted into the upper region of the passageway 25 in adjacent relation to the nozzles 78 with the nozzles, as disclosed, being mounted in wind box 84 which is open at its lower region to the area 77 and which provides an annulus about the nozzles 78 through which the combustion supporting air is conveyed to the interior of the passageway 25.

With the burner arrangement disclosed a highly turbulent rotating mass is created in the pasageway 25 which provides for rapid and efficient combustion of the auxiliary fuel as well as the combustible in the gaseous effluent of the regenerator with there being an intimate mixing and contact of the combustion supported air and the fuel. The compressed air admitted to the area 77 is heated by passing in heat exchange relation with the outer wall portion of the passageway 25. The combustion gases generated by the burning fuel passed down through the passageway 25 through openings 29 provided in the lower region thereof and thence up through the passageway 27, through openings 31 in the upper region thereof and into the upper end of the central passageway 23. These gases then pass down through this passageway and out the outlets 85 in the lower region thereof.

From these outlets the gases are conveyed through the pair of ducts 86 to the inlet of the pair of gas turbines 88, respectively. Each of these gas turbines drives an air compressor 90 which is effective to compress and deliver air at superatmospheric pressure through the connecting conduits 92 to the distribution header 94. From this header 94 the compressed air is conveyed through conduit or duct 12 to the lower end of regenerator 10 for passing up through the regenerator and stripping the catalysts therein of carbon. Also from distribution header 94 the compressed air is conveyed up through the duct 96 which is bifurcated into two branches 98 at the upper region and lead to the interior of casing 76 and to the area or volume 77 intermediate the casing 76 and the outermost annular chamber 75. This superatmospheric pressure air is heated both by means of its compression in compressor 90 and also by passing in heat exchange relation with the tubular members that form the outer wall 46 of the annular chamber 25.

The exhaust gases from the gas turbine 90 are conveyed through conduits 100 to the duct 102 with these gases entering and passing up through the housing 104 and into the stack 106. Within the housing 104 and in the path of the upwardly flowing turbine exhaust gas stream is disposed both vapor generating surface and economizer surface. The vapor generating surface comprises a pair of series connected tube bundles 108 preferably formed of sinous bent tubes with the lowermost bundle having an inlet header 110 which is connected with the outlet of pump 62 through the connecting conduit 112 so that liquid is delivered from this pump and forced through the tube bundles 108 with a portion of the liquid being vaporized and with the liquid and vapor mixture passing from the uppermost tube bundle through conduit 112 into the liquid and vapor drum 56. Downstream of the vapor generating tube bundles 108 with regard to the flow of gases through housing 104 is disposed economizer sections 114 which are preferably comprised of sinuously formed tube members with feedwater being delivered to the inlet of the economizer sections through conduit 116 and with the heated feedwater after traversing the economizer being delivered to the vapor and liquid drum 56 through conduit 118.

In the organization of FIG. 2, vapor generating surface as well as economizer surfaces may be disposed in the housing 104 with the vapor generating surface being in the form of sinuously bent tubes and in parallel with the vapor generating surface disposed within the casing 76 since the vapor generator is provided with pump means to establish a positive circulation and with orifices preferably being provided both at the inlet of the tubes 32 and at the inlet of the tubes that make up the bundles 108 or perhaps at the inlet of the conduit 112 which supplies fluid to the tube bundles 108. Through this arrangement a proper distribution of the circulating fluid is established with the two vapor generating portions in parallel flow relation each receiving a proper supply. By means of providing both vapor generating and economizer surface in the gas flow path from the gas turbines the temperature of these gases may be substantially reduced thereby providing for an efficient arrangement and a relatively low heat loss with regard to the gases passed up through stack 106.

Figure 1:
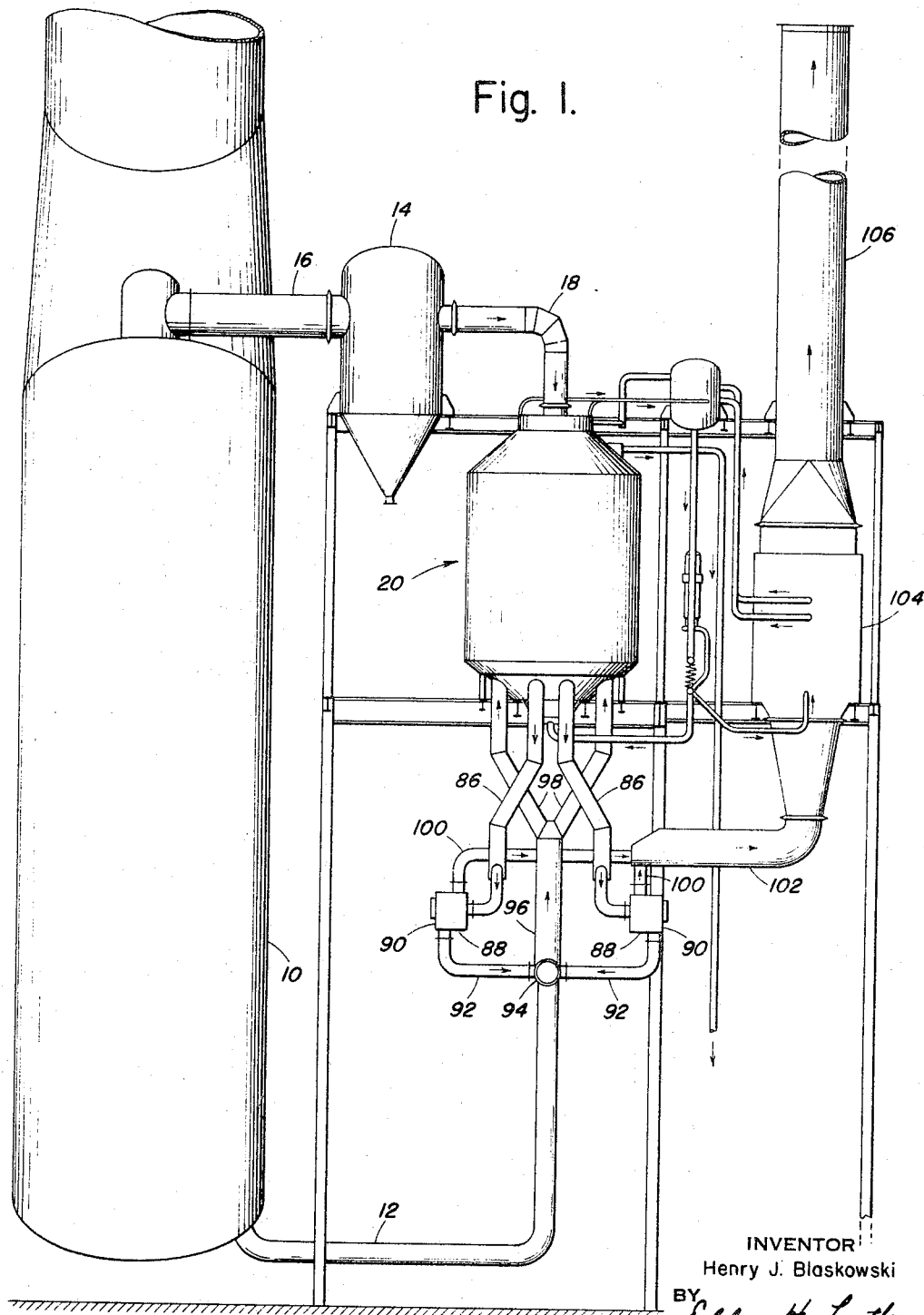
FIG. 1 is an elevational view showing one embodiment of the invention wherein the supercharged vapor generator is of the controlled circulation type with a positive circulation of fluid through the generator being provided.

The vapor generator organization of FIG. 1, as shown in more detail in FIG. 2, is supported from its lower end and for this purpose there are provided structural support members 120 and 122 which are, in turn, supported from structural members. Extending up from the structural members 122 are support members 124 which engage a portion of the lower end of casing 76 and extending up from this portion of casing 76 are the support members 126 which engage and are welded to the lower end of the tube runs 38 as disclosed in FIG. 2. A plurality of these support members 126 are provided at spaced intervals about the lower end of the vapor generator. The casing 76 also engages the structural support members 120 as shown and extending up from the casing in this region are supported members 128 which engage the lower end of the vapor generating tubes 32 with there being a number of these support members disposed about the vapor generator. Interposed between the lower end of the tube run 42 in the tube panel or at least in a number of tube panels and the lower end of the tube run 44 is a support strut 130 with the strut being welded at its ends to the associated tube runs.

Through this support arrangement the entire vapor generator within the casing 76 and the casing itself is supported and rests upon its lower end with the various ducts and headers being supported from the tube members of the vapor generator.

The embodiment of the invention disclosed in FIGS. 7 through 10 is somewhat similar to that previously described and illustrated in FIGS. 1 through 6 except that this modified vapor generator is of the natural circulation rather than the control circulation type. The vapor generating tubes of the FIGS. 7 through 10 embodiment are mounted within the pressure resistant fluid tight casing 76 in a manner to form the three concentric chambers 25, 27 and 23 and this modified vapor generator is fired in the same manner as the previously described organization receiving compressed air at superatmospheric pressure through conduits 98 and receiving regenerator effluent gas through duct 18. This effluent gas enters the annular chamber 132 and is distributed through the ducts 134 to the nozzles 78 with air being passed into the chamber 25 about these nozzles from the area 77.

Since the vapor generator of FIGS. 7 through 10 is of the natural circulation type the tubular coil arrangement employed in the control circulation unit cannot be utilized in this modified arrangement. In lieu of such construction the internested chambers 25, 27 and 23 have their respective walls formed by means of vapor generating tubes connected between the annular distribution header 136 and the annular collection header 138. The walls of these chambers are defined by means of vapor generating tubes 140 which extend between the aforementioned headers with adjacent tubes being welded together to provide a generally imperforate wall structure. Where the tubes are spaced the space is filled by means of fins or spacer elements 142 which in turn are welded to the respective tubes. The tubes 140 at the lower region of the annular wall 48 are spaced to provide an opening as disclosed between the outer annular chamber 25 and the intermediate chamber or inner annular chamber 27 while the tubes 140 are spaced at the upper region of the wall 44 so as to provide a similar passageway for the gases. The central chamber 23 is provided with a roof member 144 and the lower end of this central chamber communicates with the outlet duct 146 from which extends suitable ducts that lead to the previously described gas turbines 88. The gases introduced into the outer annular chamber or passageway 25 in a tangential manner passed down to the passageway and up through the adjacent passageway 27. They then pass from the upper end of this passageway 27 and down through the central passageway 23 to the outlet duct 146.

Extending up from the annular header 138 are struts 148 which also form uptakes from this header and which are connected with and support the vapor and liquid drum 150. This vapor and liquid drum, as best disclosed in FIG. 10, includes the annular chamber 152 into which the vapor and liquid effluent from the header 138 is conveyed. This effluent passes from this chamber 152 up through the separators 154 which may advantageously take the form as disclosed in U.S. Patent No. 2,648,397 to Ravese et al. The separators are effective to separate the vapor from the liquid with the vapor passing up through and out the upper end of the separators to the upper region of drum 150 while the liquid is returned to the lower end of the drum. Feedwater is supplied to drum 150 through the conduit 156. Extending down through the central region of drum 150 from the upper portion thereof and through the bottom of the drum is the conduit 158 which supplies vapor to the superheaters 160. This superheater is in the form of a number of sinuously bent tubes in spaced relation throughout the annular chamber or passageway 27 with these tubes being connected at their inlet with the lower end of the conduit 158 and being connected at their outlet at the pipe type header 162. These tubes in the illustrative arrangement are identified as 164 and from which the superheated vapor is conveyed to the desired point of use.

The circulating circuit of the vapor generator includes the downtakes 166 which extend from the lower end of vapor and liquid drum 150 down through the centermost chamber or passageway 23 and are connected to the distribution header 136. These downtakes supply liquid to this header with this liquid then passing up through the vapor generating tubes 140 that make up the walls of the several chambers of the vapor generator wherein a portion of the liquid is vaporized with the liquid and vapor mixture being collected in the header 138 from which it is conveyed through struts 148 through the drum 150.

In the modified organization of FIGS. 7 through 10 the exhaust gases from the gas turbines 88 pass up through the housing 104 in the same manner as the previously described embodiment but in this modified arrangement there is provided in this housing only the economizer sections 114 of the vapor generator from which the feedwater is supplied through conduit 158 to the vapor and liquid drum 150 as aforesaid. Vapor generating surface is not provided in the housing 104 in this natural circulation embodiment of this invention because of the circulation problems involved in that it would be impossible to use the sinuously bent tube bundles such as 108 in the previously described organization of FIG. 2 and moreover an adequate description of the circulation would present a problem.

The natural circulation vapor generator of the FIGS. 7 through 10 embodiment is supported from the lower end through suitable structural members 120 and 122 in the same manner as the control circulation embodiment. In this modified arrangement the annular distribution header 136 is effectively supported from the structural members 122 through the support members 168 and the vapor generating tubes 140 extending upwardly from this distribution header are effectively supported from the header. By means of the strut arrangement 148 the drum 150 which engages and extends through the casing 76 in a generally fluid type manner is supported effectively from the lower region of the vapor generator through the vapor generating tubes.

Accordingly with the present invention it will be appreciated that an improved and novel organization is provided wherein the vapor generator is supercharged and wherein the gaseous effluent from the regenerator of the catalytic cracker is supplied to the generator.

With the invention a mechanism is established to hold down the absorption of heat in the waterwall in the vicinity of the burners and even out the absorption of heat throughout the furnace. In firing under superatmospheric pressure, because of the concentration of fuel and oxygen in smaller volumes, shorter and smaller flame volumes are sustained. The heat is therefore liberated in a smaller space and flame temperatures will be considerably higher than when firing under atmospheric conditions or pressure. Whereas in the usual atmospheric pressure type furnace, maximum average gas temperatures in burner region can be expected to fall short of the theoretical maximum or adiabatic flame temperature by 600 to 800° F., under pressure firing the average gas temperature in the burner region approaches, because of the concentration of the reacting gases, to within 100° F. or so of adiabatic temperature. Because of this, more of the heat in the burner region will be passed to the wall by the nonluminous radiation phenomena. Wherein the concentration of radiated heat is a function of radiant beam length. To keep down too high a heat absorption in the burner area it is required that a small beam length be maintained. The beam length approaches as a minimum the smallest furnace dimension which in this case is the distance between walls 48 and 46. The design (annular furnace chamber with tangential firing) holds down the beam length therefore reduces the maximum absorption in the furnace and compensates for loss of luminous radiation by turbulent convection pick up in the walls 48 to 46.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In combination a regenerator for a catalytic cracker, a vapor generator receiving, under superatmospheric pressure, the gaseous effluent from said regenerator as a portion of the fuel thereof, said generator including a plurality of internested passageways defined by tubular heat exchange elements and interconnected to define a sinuous gas flow path, means introducing said effluent together with combustion supporting air into the outermost passageway in a direction tangent to an imaginary cylinder having the same axis as the internested passageways and having a diameter less than that defined by the outermost tubular heat exchange elements, turbine means receiving and being driven by the gases passing from the centermost passageway, compressor means driven by said turbine means and effective to supply said combustion supporting air at superatmospheric pressure to said outermost passageway and also to said regenerator and additional heat exchanger surface forming part of the vapor generator, means directing the exhaust from the turbine over this additional heat exchange surface, and means for removing said exhaust after traversal of said additional heat exchange surface.

2. In combination a regenerator for a catalytic cracker, a vapor generator receiving as at least part of its fuel the gaseous effluent from said regenerator together with combustion supporting air for burning of the burnables in said effluent therein, said vapor generator including a tubular vapor generating circuit through which the fluid medium of the vapor generator is conveyed with the gases passing through the generator imparting heat thereto, a vapor and liquid drum receiving a mixture of vapor and liquid from said circuit and effective to separate the vapor from the liquid, gas turbine means receiving as its driving medium combustion gases which have traversed said vapor generator, compressor means driven by said turbine means and effective to supply said combustion supporting air at superatmospheric pressure to said vapor generator and also to supply such air to the regenerator, additional heat exchange surface forming part of the heat exchange surface of the vapor generator and means directing the exhaust gases of the turbine over this additional heat exchange surface and thereafter conveying the gases therefrom, said additional heat exchange surface being connected with said vapor and liquid drum.

3. In combination a regenerator for a catalytic cracker providing a high temperature gaseous effluent at superatmospheric pressure and containing CO, a vapor generator receiving as at least part of its fuel the gaseous effluent from said regenerator together with combustion supporting air for burning the burnables of said effluent within said vapor generator, said vapor generator including a tubular vapor generating circuit through which the fluid medium of the vapor generator is conveyed with the gases passing through the generator imparting heat thereto, a vapor and liquid drum receiving a mixture of vapor and liquid from said circuit and effective to separate the vapor from the liquid, pump means operative to withdraw fluid from said drum and force it through said circuit, gas turbine means receiving as its driving medium combustion gases which have traversed said vapor generator, compressor means driven by said turbine means and effective to supply said combustion supporting air at superatmospheric pressure to said vapor generator, heat exchange means, means directing the exhaust from said gas turbine means over said heat exchange means to absorb heat from the exhaust and reduce the temperature thereof, means conveying said exhaust from said heat exchange means, said heat exchange means comprising additional vapor generating surface which is connected to receive fluid from said pump and to deliver the same to said drum and also comprising economizer surface that is connected to receive feedwater from a suitable source with this economizer surface having its outlet connected with said drum.

4. In a vapor generator system the combination of a generally cylindrical casing member, tubular members within said casing member and disposed to form a plurality of internested chambers interconnected to provide a sinuous gas flow path with the outermost chamber being of annular transverse section, a vapor and liquid drum with which one end of said tubular members communicate and means for conveying liquid from said drum to the other end of said tubular members, means operative to introduce fuel and combustion supporting air at superatmospheric pressure and in a tangential manner into the outermost chamber to create a whirling gas mass, gas turbine means receiving the gaseous effluent from the innermost of said chambers, compressor means driven by said turbine means and operative to supply combustion supporting air at superatmospheric pressure to said generator, said air being supplied intermediate the casing member and the outermost chamber, additional heat exchange surface forming a part of the heat exchange surface of the vapor generator and means directing the exhaust gases from said gas turbine over this additional heat exchange surface and thereafter away from said additional heat exchange surface.

5. A supercharged vapor generator comprising in combination an upright pressure resistant casing, vapor generating means including a portion disposed within said casing in spaced relation therewith and including tubular members welded together to form a central upright passage and a plurality of annular passageways disposed thereabout with openings being provided therebetween to form a sinuous gas flow path, said tubular members comprising vapor generating surface of the vapor generator, means establishing a circulation of liquid through the tubular members, burner means introducing fuel and air into the outermost passage in a manner to create a whirling gas mass rotating about the axis of said passageway, means supplying air at superatmospheric pressure intermediate said casing at the outermost passageways and means introducing this air into this passageway as the combustion supporting medium, turbine means receiving the combustion gases after traversal of said passagewys, compressor means driven by said turbine and operative to supply said superatmospheric pressure air as aforesaid, economizer surface, and means directing the exhaust from said turbine over said economizer surface to impart heat thereto and to reduce the temperature of said exhaust, and means conveying said exhaust from said economizer surface.

6. A supercharged vapor generator comprising in combination a vertically disposed generally cylindrical pressure tight housing, vapor generating tube members disposed within said housing and arranged to form therewithin a central upright passage the walls of which are comprised of vertically extending tube members welded together generally throughout their length, an inner and an outer annular passageway the walls of which are similarly formed said annular passages being in communication at their lower ends and said central passage and inner annular passage being in communication at their upper end, a vapor and liquid drum with which the upper end of said tubular members communicate and downcomer means extending from said drum and conveying liquid to a distribution means with which the lower end of said members is connected, compressor means supplying air at superatmospheric pressure to the interior of said housing, means introducing fuel and air at superatmospheric pressure into the upper region of the outer passageway from a plurality of symmetrically disposed locations and in a direction to create a whirling gas mass therewithin, this last-named means including ducts disposed within said casing to convey said pressurized fuel and means admitting air into the passageway from within the casing, gas turbine means receiving and driven by the combustion gases that pass through said passageway, economizer heat exchange surface effective to supply heated feedwater to said liquid and vapor drum, means directing the exhaust from said turbine over said economizer surface to impart heat thereto and thereafter conveying said exhaust from said surface, and structural support means upon which said casing and said tubular members that form said passageways rest whereby these elements are supported from their lower region.

7. A vapor generator comprising in combination a casing, a plurality of tubular sections disposed within said casing about the axis thereof with each section being comprised of a continuous tube formed into a plurality of loops and positioned in side-by-side relation with the loops being formed so as to produce a plurality of internested chambers interconnected to provide a sinuous gas flow through the chambers, said sections forming the vapor generating surface of the vapor generator, a vapor and liquid drum connected to receive the effluent from the upper end of said sections, means operative to convey liquid from said drum to the lower ends of said sections, a compressor means effective to introduce superatmospheric pressure air into said casing outwardly of said chambers, means directing fuel together with said air into the outermost of said chambers and in a manner tangent to an imaginary cylinder co-axial with said casing and having a diameter such as to fall within the outermost chamber.

References Cited by the Examiner

UNITED STATES PATENTS

| | | |
|---|---|---|
| 1,746,158 | 2/30 | Loffler. |
| 1,917,275 | 7/33 | Rossman et al. 122—235 |
| 2,044,270 | 6/36 | Wood 122—235 |
| 2,063,928 | 12/36 | Holyworth 60—39.07 |
| 2,271,880 | 2/42 | Wood 122—235 |
| 2,407,882 | 9/46 | Hutchinson et al. 23—281 |
| 2,491,303 | 12/49 | Eastman 252—416 X |
| 2,497,053 | 2/50 | Wills 23—288 |
| 2,502,941 | 4/50 | Giger et al. 60—39.07 |
| 2,648,397 | 8/53 | Ravese et al. 55—343 |
| 2,787,121 | 4/57 | Bouffart 60—39.07 |
| 2,840,049 | 6/58 | Durham 122—333 |
| 2,853,455 | 9/58 | Campbell et al. 252—416 X |
| 2,925,329 | 2/60 | Yost 23—281 |
| 3,003,851 | 10/61 | Winn 23—260 X |

MORRIS O. WOLK, *Primary Examiner.*

GEORGE D. MITCHELL, *Examiner.*